Figure 1:
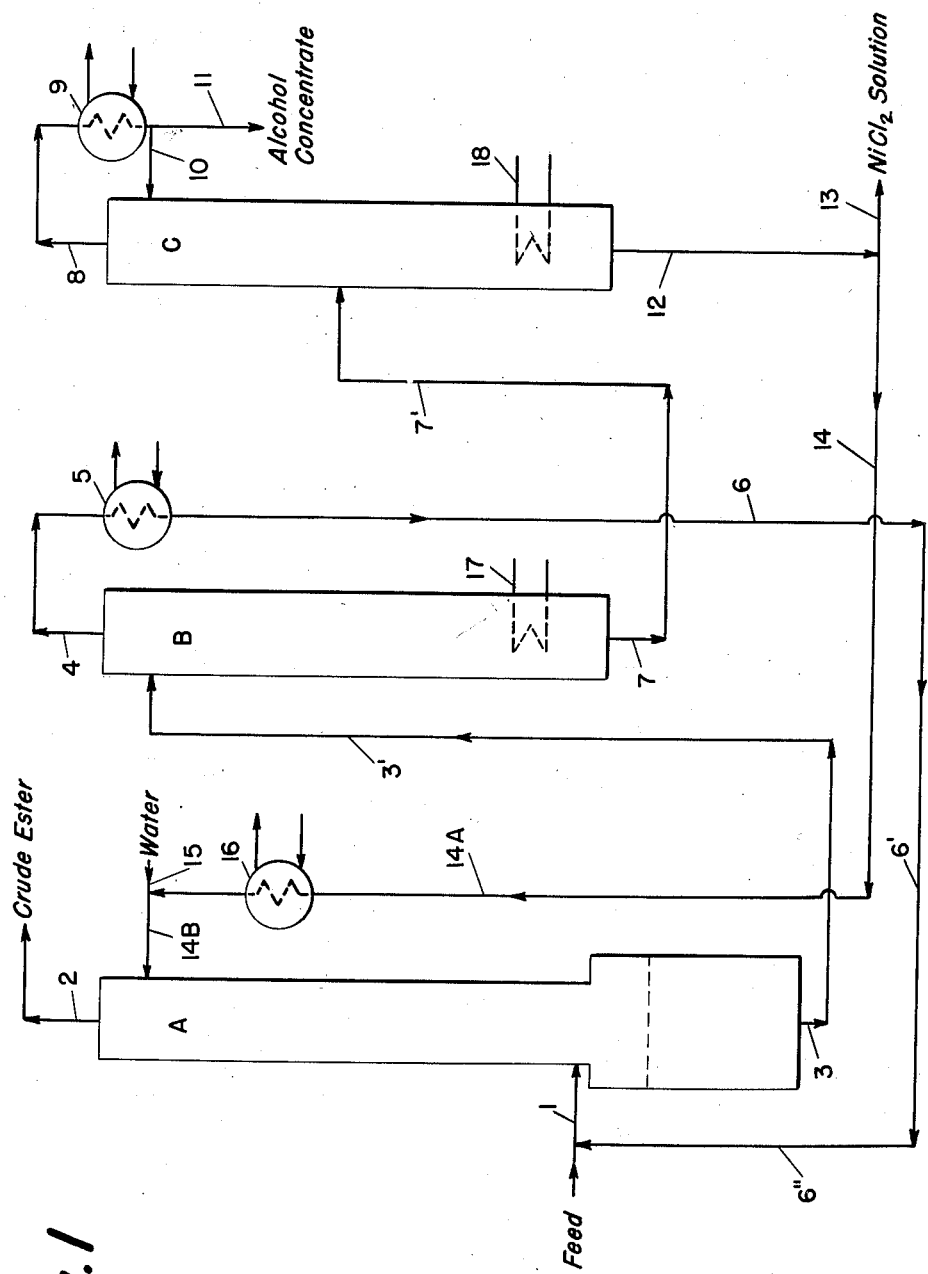
Figure 2:
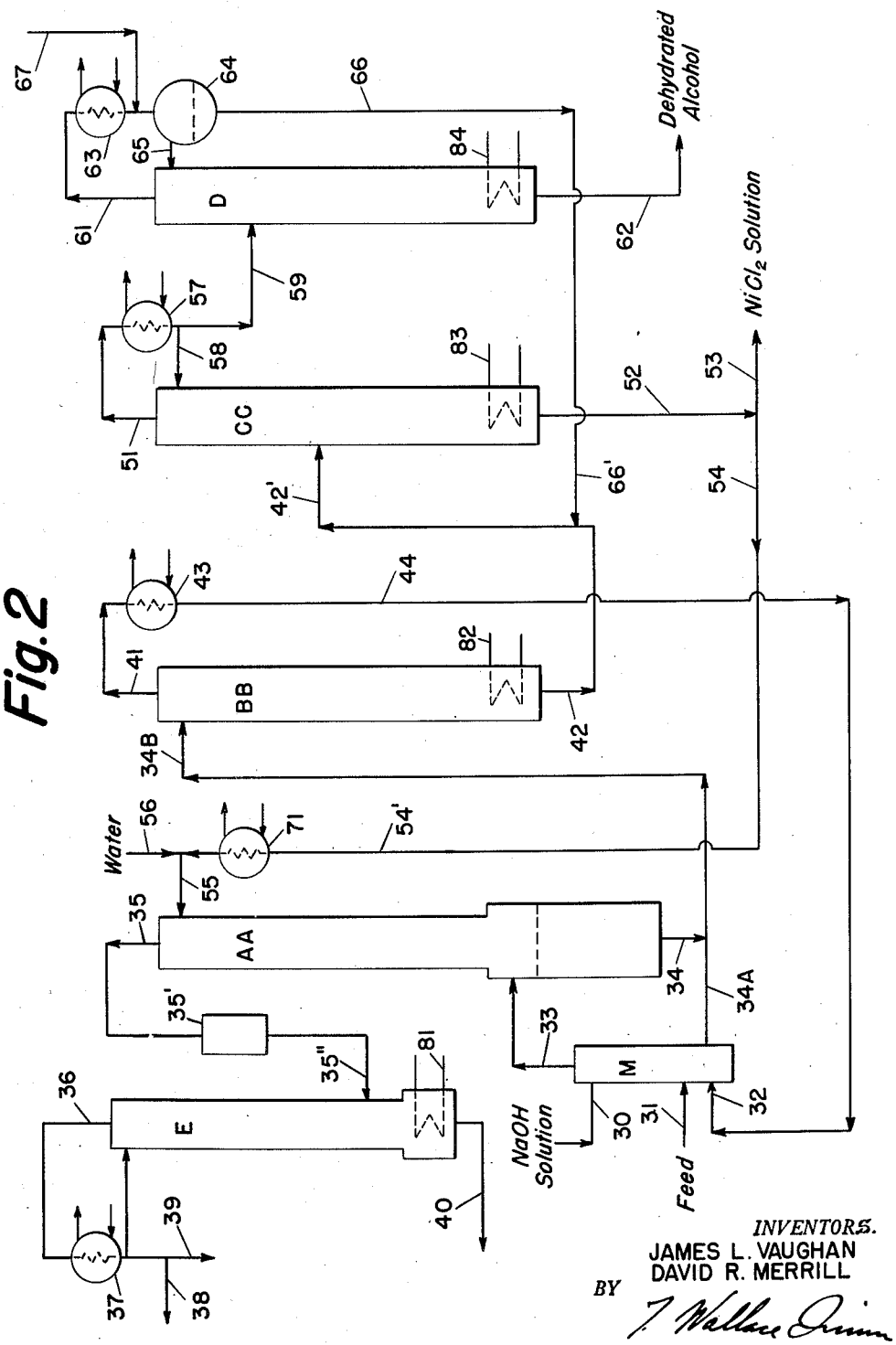

Patented Jan. 15, 1952

2,582,299

UNITED STATES PATENT OFFICE 2,582,299

METHOD FOR SEPARATING ACRYLIC ACID ESTERS, ALCOHOLS, AND NICKEL CHLORIDE FROM MIXTURES THEREOF

James L. Vaughan, Morrisville, Pa., and David R. Merrill, Moorestown, N. J., assignors to Rohm & Haas Company, Philadelphia, Pa., a corporation of Delaware Application August 23, 1950, Serial No. 180,942

10 Claims. (Cl. 260—486)

This invention concerns a process for separating an acrylic ester and recovering a nickel salt and an alcohol from a mixture comprising an acrylic ester, a nickel salt, and an alcohol. It is particularly directed toward the efficient separation of these materials without contamination or introduction of extraneous substances. The process permits the reuse of the nickel and of the alcohol in a process in which the said mixture is produced.

A process has been described in which acetylene, nickel carbonyl, an alcohol, and an acid are reacted to form an ester of acrylic acid and the alcohol. The nickel carbonyl is converted to a nickelous salt of the acid. Excess alcohol is used to dissolve or suspend this salt. Thus, the reaction mixture obtained contains acrylic ester, alcohol, and nickel salt as the main components. It often also contains a small amount of free acid, since excess acid may prove favorable for completing the reaction and for utilizing the last trace of nickel carbonyl. The reaction products may also contain dissolved acetylene and by-products, such as propionate and vinylpropionate esters and higher boiling impurities.

An improvement over the above process has been discovered and is described in application Serial No. 173,482, filed July 12, 1950, by Neher, Specht, and Neuman. In the improved process acetylene, carbon monoxide, and alcohol are reacted to form acrylic ester in the presence of the reaction of acetylene, nickel carbonyl, alcohol, and acid. The reaction mixture which results resembles that described above in containing ester, alcohol, and nickel salt together with small amounts of by-products, dissolved acetylene, and sometimes acid.

Various methods have been proposed for resolving the above reaction mixtures. None has heretofore proved entirely satisfactory. It is, of course, essential to obtain the acrylic ester in a relatively pure form which permits its use in the preparation of acrylic polymers and copolymers. At the same time it is highly desirable to recover the excess alcohol in a form which permits its reuse. It is an economic necessity to retrieve the nickel content in a form which allows its reconversion to nickel carbonyl and, therefore, its repeated use in the reaction to form acrylic ester.

In separations involving acrylic ester, alcohol, and water there are complications. Some result from formation of azeotropes. The esters and alcohols form azeotropes, various alcohols and water form azeotropes, esters and water form azeotropes. Problems arise also from solubility of esters in water or aqueous solutions. Then there must be considered the possibility of polymerization of acrylic esters during separation and purification and there must be considered the need for obtaining esters in such form that they can be polymerized or copolymerized when it is desired by the usual methods in satisfactory and useful forms. Any practical process for separation and isolation of acrylic esters must successfully meet these and other considerations.

In its simplest aspect the process of this invention comprises contacting a mixture containing an acrylic ester of a monohydric alcohol which is soluble in water and distills in the presence of water below about 100° C., a said alcohol, and nickel chloride with a feed of an aqueous solution of nickel chloride, separating therefrom and taking off an organic layer containing principally said ester, separating an aqueous layer containing nickel chloride, said ester, and said alcohol, distilling from said aqueous layer a light fraction containing said ester, then distilling from the aqueous layer a fraction containing said alcohol, returning a part of the aqueous layer from which said fractions have been distilled to supply the feed of nickel chloride solution upon diluting it with water, and taking off the other part of said aqueous layer. The organic layer containing ester may be fractionated or otherwise purified as desired. The light fraction containing ester stripped from the aqueous layer may also be worked up, but it is advantageous to return this light fraction to the initial mixture or feed of ester, alcohol, and nickel salt. The fraction containing the alcohol may, if desired, be returned to the reaction system wherein alcohol is reacted with acetylene, nickel carbonyl, and acid or with acetylene, carbon monoxide, nickel carbonyl, and acid. The fraction may advantageously be redistilled to give a purer alcohol or it may be dehydrated by an azeotropic technique with recycling of light fractions to give maximum efficiency of operation. Other variations in procedure will be evident in the further exposition of the process of this invention.

One of these variations concerns the neutralization of small amounts of acid which may be present in the mixture of acrylic ester, alcohol, and nickel salt. Since it is desirable to consume all of the nickel carbonyl in the reaction wherein acrylic ester is formed, an excess of acid is frequently used at least in a final or clean-up step. Any free acid is preferably neutralized as the feed mixture is supplied for resolution. This may be readily accomplished according to one method of operation in a mixing zone preparatory to the extraction of the mixture with nickel chloride brine. Introduction of a small amount of a solution of sodium hydroxide or similar alkaline reagent as required disposes of any free acid. Alternatively, alkali may be introduced with the water used to dilute recycled nickel chloride brine.

The invention will be further described with reference to the accompanying drawings. Figure I is a diagram which represents apparatus suitable for carrying out the process of this invention and at the same time serves as a flow diagram presenting the invention in its simpler aspects. Figure II represents a system in which the basic process is utilized along with modifications and optional modes of procedure. In these two figures there are indicated only essential or desirable elements, minor elements, such as pumps, valves, and the like, being omitted. Their use and proper placement are fully evident to those skilled in the art.

With reference to Figure I, it will be seen that there are three major elements or zones, A, an extraction element or zone, B, a first distillation zone, and C, a second distillation zone. The extraction element may take the form of a column up which the organic components of the feed mixture flow and down which there flows a nickel chloride brine or solution. This element may contain packing or plates or other devices for bringing the brine and feed mixture into intimate contact. The extraction zone or element is arranged to permit settling and withdrawal of nickel chloride brine with its acquired content of organic materials.

The two distillation zones are supplied with heat, as, for example, through use of steam in coils indicated at 17 and 18. Vapors from these elements or zones are cooled in condensers 5 and 9. It may be mentioned that the two zones, while indicated as constituting separate elements, may be combined in a single distillation column or may be spread over more than two columns.

The various zones or elements are connected as indicated in the drawing.

The feed, a mixture of acrylic ester, alcohol, and nichel chloride, is introduced into the extraction zone, A, at 1. In this zone it meets nickel chloride brine introduced at 14B. The feed passes upwardly through the extraction element with solution of alcohol and nickel chloride by the downwardly flowing brine. Organic material leaves the extraction zone at 2 as principally acrylic ester. The brine with its added nickel chloride and its alcohol content and some ester collects in a lower portion of A and is drawn off through 3 and passed through line 3' into distillation zone or column B, where a light fraction is taken off through 4. This fraction is condensed at 5, if desired, with partial reflux (not shown in the drawing). This condensed fraction is recycled through lines 6, 6', and 6'' to the feed or to the extraction zone.

The brine solution with its alcohol content is withdrawn from element B at 7 and passed through line 7' into distillation column or zone C. Here it is stripped of its alcohol content which is withdrawn at 8, condensed at 9, and taken off at 11. The distillation is best accomplished with reflux as indicated by the return line 10 from condenser 9. Concentrated brine is withdrawn from C at 12. Some of this brine is taken off at 13 and the rest is passed through lines 14 and 14A. The returned brine is cooled in heat exchanger 16. After dilution with water from 15 the brine is passed through 14B back into extraction element A. If desired, there may be introduced in the water at 15 enough alkaline reagent to neutralize acid in the reaction mixture introduced at 1. Alkali may, of course, be introduced at any other convenient point.

With reference to Figure II, the extraction zone or element or column is indicated as AA, the first distillation zone as BB, and the second distillation zone as CC, these zones or elements being comparable to A, B, and C respectively of Figure I. They are supplemented by distillation column D, which serves in the case of ethyl alcohol, the propyl alcohols, and tert.-butyl alcohol for dehydration and by distillation column or zone E, wherein the washed ester from the extraction zone is purified. The system is amplified by use of a mixing zone, M, wherein feed, recycled light fraction from the first distillation zone and neutralizing solution, if desired, are combined. There may also be cycled in the mixing zone nickel chloride brine from the extraction zone. A means for accomplishing this is shown in Figure II, wherein nickel chloride brine from the lower part of AA is withdrawn through line 34 and partially cycled through line 34A to the mixer, M.

The course of flow in the system of Figure II starts with the feed introduced at 31 into the mixing zone. From this zone the feed passes through line 33 into the extraction zone, preferably at an intermediate or low point therein so that the organic material passes upwardly through the extraction zone and leaves at 35 while nickel chloride brine drawn from line 55 passes downwardly in the extraction zone and is collected in the lower part of the extraction apparatus. The extracted organic material comprising principally ester passes through lines 35 and 35'' and storage tank 35' into a distillation system, E, for purifying the acrylic ester.

Essential parts of such a system which may be operated batchwise are shown in the drawing. The organic liquid in the column or zone E is heated at 81 representing a closed steam coil. Overhead is withdrawn at 36 and condensed with reflux at 37, gases being taken off at 38. Ester is taken off at 39. Such system may be operated at normal or reduced pressures and may comprise more than a single column if so desired. In a multiple distillation set-up an alcohol fraction may be recycled to the mixer, extraction zone, or the first distillation zone, BB.

Nickel chloride brine is withdrawn from the extraction zone at 34 and passed through line 34B into the first distillation zone, BB, where with the aid of heat supplied, for example, through steam coil 82 a fraction comprising ester, alcohol, and water is withdrawn at 41 and condensed at 43, recycled through line 44 to the mixer at 32, or to the feed, or to the extraction zone proper.

The nickel chloride brine, stripped of ester but still containing alcohol, is withdrawn from BB at 42 and passed through the line 42—42' into distillation zone CC. Here heat is supplied as through steam coil 83 and alcohol is distilled from the brine. Strong brine then flows from CC at 52 and is in part taken off through line 53. This brine may be sent to a plant where the nickel content is recovered or converted to nickel carbonyl, which in turn is used in the production of an acrylic ester by reactions earlier described. The rest of the strong brine is passed through lines 54 and 54', through the cooler 71, and, after dilution with water from line 56, through line 55 back into the extraction apparatus, AA.

The alcohol fraction from the second distillation zone, CC, is withdrawn at 51, condensed at 57, desirably with reflux through line 58, and passed through line 59 into a third distillation zone, D, where with the heat supplied as from steam coil 84, the alcohol is purified. This zone as shown in the drawing is arranged for dehydrating alcohols which form azeotropes. It may alternatively be arranged for purifying by redistillation. As shown, vapor is taken off at 61 and passed into condenser 63. Reflux is supplied from reservoir 64 through line 65. The condensate is taken off through lines 66—66' and recycled. A suitable method for returning this condensate is to pass it into the liquor fed to the second distillation zone. It may alternatively be recycled to the first distillation zone.

When it is desired to dehydrate the alcohol, particularly in the cases wherein ethyl alcohol, isopropyl alcohol, and tert.-butyl alcohol are recovered, benzene is admitted at 67 and passed with reflux from 64 into distillation column D. The purified, dehydrated alcohol is taken off at 62. Other systems of alcohol purification, rectification, and dehydration may, of course, be substituted for the above.

The process as described is particularly applicable to the separation of a mixture of methyl acrylate, methyl alcohol, and nickel chloride, or of ethyl acrylate, ethyl alcohol, and nickel chloride, or of propyl or isopropyl acrylate, propyl or isopropyl alcohol, and nickel chloride, or of tert.-butyl acrylate, tert.-butyl alcohol, and nickel chloride, or in general to the separation of nickel chloride, acrylic ester, and an alcohol which has substantial solubility in water and boils below about 100° C. or forms an azeotrope with water which boils at a temperature not substantially in excess of that of water, with appropriate modifications in temperatures, ratios of brine to organic materials, and other suitable adjustments.

Extraction of nickel chloride and alcohol in the extraction zone is usually performed at a temperature between 0° and 40° C. The concentration of nickel chloride in the aqueous solution passed into the extraction zone may be varied from 5% or less to 30% or more. A preferred concentration range is 10% to 25%. In the purification of the acrylate, polymerization inhibitors may be used, as is known in the art.

In a typical separation of a mixture containing ethyl acrylate, ethyl alcohol, and nickel chloride there was fed to a mixing column 3000 parts by weight per hour of a mixture containing 60% of ethyl acrylate, 27% of ethyl alcohol, and 6.5% of nickel chloride, the balance of the mixture being water, benzene, heavy ends, acetylene, and acid (0.05%). There was also fed to the mixer 34.2 parts per hour of a 5% sodium hydroxide solution and 1100 parts per hour of the overhead distillate from the first distillation zone. This overhead contained about 12% of ethyl acrylate and 50% of ethyl alcohol with the balance chiefly water. The material from the mixer was passed into an extraction column. While the organic material was flowing upward in the extraction column, a 13.3% solution of nickel chloride in water at 10° C. was passed downward from distributing nozzles at a rate of 9000 parts per hour to give good contact of organic material and nickel chloride solution. There was withdrawn from the base of the extraction column at a rate of about 11,000 parts per hour a solution containing 1.1% of ethyl acrylate, 12.9% of alcohol, and 12.4% of nickel chloride. This solution was passed to the first distillation column where it was heated. An overhead fraction was taken at 85° C. and returned to the mixer. There was withdrawn from the base of this column a solution containing 8% of alcohol and 14% of nickel chloride. This solution was passed to the second distillation zone where the solution was stripped of alcohol. The nickel chloride solution resulting contained over 15% of nickel chloride. It was in part passed back to the extraction zone with cooling and dilution. Some 15% nickel chloride solution was constantly taken off, this amounting to about 1250 parts per hour. The alcohol fraction taken off under reflux was 90% alcohol with about 2% of benzene. This fraction was purified in a column to which benzene was added at a rate of about 5 parts per hour with recycle of 185 parts per hour from the reflux separator to the second distillation column. From the base of the column was taken off a 99.3% alcohol, containing 0.6% of benzene. This was entirely satisfactory for reaction with nickel carbonyl, acid, and acetylene for the production of ethyl acrylate.

From the head of the extraction column there was withdrawn an organic material containing about 90% of ethyl acrylate, which was further purified on distillation to give a product which was highly satisfactory for forming polymers and copolymers.

By a similar procedure there may be resolved mixtures of isopropyl acrylate, isopropyl alcohol, and nickel salt, or propyl acrylate, propyl alcohol, and nickel salt, or tert.-butyl acrylate, tert.-butyl alcohol, and nickel salt, or any similar mixture, the alcohol of which has substantial solubility in water and can be distilled from a nickel chloride brine. The temperatures in the various distillation zones will, of course, depend upon the particular separation made and upon the pressures used, for separation may be effected under reduced as well as normal pressures. For the named mixtures conditions will not be greatly different than those recited in the above illustrative example.

In the separation of a mixture containing 54% of methyl acrylate, 29% of methyl alcohol, 6.5% of nickel chloride, and 10.5% of water, heavy ends, acetylene, and acid there was fed to an extraction column 3300 parts by weight per hour of this mixture. There were fed to the head of this column 120 parts of a 5% solution of sodium hydroxide, this being equivalent to the total acidity of the feed mixture, and 12,780 parts of a 13.5% nickel chloride solution. Organic layer and nickel chloride brine separated at an intermediate level in the extraction column. From the top of the column there was drawn off a mixture containing 83% of methyl acrylate, 0.05% of methyl alcohol, 2% of water, heavy ends, and dissolved gas, this mixture amounting to 2100 parts per hour. Thereto was added two pounds per hour of hydroquinone and the resulting mixture was passed to a storage tank, from which it was drawn to a batch still. Here, there was taken off as overhead 1700 parts per hour of practically pure methyl acrylate.

From the lower part of the extraction column there was withdrawn 16,600 parts per hour of an extract containing 11.8% of nickel chloride, 13.2% of methyl alcohol, 3.3% of methyl acrylate, and 71.3% of water together with a fractional percent of heavy ends and sodium chloride. This extract was passed to a distilling column and heated. An overhead amounting to 2600 parts per hour was taken off at 80° C. This contained 21% of methyl acrylate, 46% of methyl alcohol, and 32% of water. This overhead was returned to the lower part of the extraction column. From the base of the above distillation column there was withdrawn 14,000 parts of a mixture containing 7% of methyl alcohol, 78% of water, and 14% of nickel chloride. This was passed into a second distillation column where it was heated and 960 parts of 99.9% methyl alcohol was taken off with reflux. From the base of the column there was taken off a 15% solution of nickel chloride. Of this 1400 parts per hour were withdrawn from the system and sent to a nickel recovery process. The remaining 11,640 parts were cooled to 20° C. and diluted with 1140 parts per hour of water and 120 parts per of the caustic solution as shown above.

The above course of procedure can be, if so desired, applied to the resolution of other mixtures of ester, alcohol, and nickel salt. The alcohol taken off will then be the alcohol-water azeotrope which may be reused directly or further purified for reuse in the reaction yielding acrylates.

The described procedures are highly efficient and advantageous. The acrylic ester is obtained in a form suitable for use in polymerization reactions or for use as a chemical reactant. The alcohol is recovered in a form ready for reuse. The nickel content is recovered without contamination and without loss and, if desired, can be converted to nickel carbonyl which is used in the processes for preparing acrylates from acetylene and alcohol, as described above.

We claim:

1. A process for obtaining an ester of acrylic acid and a water-soluble, saturated, aliphatic, monohydric alcohol distilling in the presence of water below about 100° C., separating a said alcohol, and recovering the nickel content from a mixture comprising said ester, said alcohol, and nickel chloride which comprises bringing into intimate contact with said mixture an aqueous solution of nickel chloride, forming from said mixture and said solution an organic layer comprising said ester and an aqueous layer containing the nickel chloride from both said mixture and said solution and also containing ester and alcohol, separating the organic layer and the aqueous layer, subjecting this aqueous layer to distillation, removing therefrom a light fraction containing ester, then distilling therefrom a fraction containing the alcohol, leaving an enriched solution of nickel chloride, withdrawing a portion of this solution, diluting the other portion with water, and using it as the said aqueous solution of nickel chloride brought into intimate contact with said mixture.

2. A process for obtaining an ester of acrylic acid and a water-soluble aliphatic alcohol, ROH, in which R is an alkyl group of not over four carbon atoms, separating a said alcohol, and recovering nickel chloride from a mixture comprising said ester, said alcohol, and nickel chloride which comprises introducing said mixture into an extracting zone, there bringing it into intimate contact with an aqueous solution of nickel chloride, taking off from said zone an organic liquid rich in said ester, withdrawing an aqueous layer containing said alcohol, said ester, and nickel chloride from both said mixture and said aqueous solution, distilling ester from the withdrawn aqueous layer, then distilling off the alcohol to form an enriched nickel chloride solution, taking off a part of said enriched solution, diluting the rest of it with water, and returning the diluted solution to the extracting zone.

3. A process for obtaining an ester of acrylic acid and a water-soluble, aliphatic, monohydric alcohol, ROH, in which R is an alkyl group of not over four carbon atoms and recovering an alcohol and the nickel content from a mixture comprising said ester, a said alcohol, and nickel chloride, which comprises passing said mixture into an extraction zone at an intermediate point thereof, flowing it upwardly in said zone, introducing into said zone at an upward point thereof an aqueous solution of nickel chloride, passing it downwardly through the upwardly flowing mixture, taking off from an upward portion of said zone an organic liquid rich in said ester, withdrawing from said zone an aqueous solution of alcohol, ester, and nickel chloride, distilling from said solution in a first distillation zone a fraction containing ester, returning the ester-containing fraction from the first distillation zone to the extraction zone, distilling in a second distillation zone the alcohol from the solution resulting after distilling off ester, whereby a bottoms solution is obtained rich in nickel chloride, taking off a part of said bottoms solution, diluting with water the other part thereof, and passing the resulting diluted solution into said extraction zone at said upward point.

4. The process of claim 3 wherein the alcohol is methyl alcohol and the ester is methyl acrylate.

5. A process for obtaining an ester of acrylic acid and a water-soluble, aliphatic, monohydric alcohol, ROH, in which R is an alkyl group of not over four carbon atoms and recovering an alcohol and the nickel content from a mixture comprising said ester, a said alcohol, and nickel chloride which comprises passing said mixture into an extraction zone at an intermediate point thereof, flowing it upwardly in said zone, introducing into said zone at an upward point thereof an aqueous solution of nickel chloride, passing said solution downwardly through the upwardly flowing mixture, taking off from an upward portion of said zone an organic liquid rich in said ester, fractionally distilling said portion, separating therefrom said ester, withdrawing from a lower point of said zone an extract containing alcohol, ester, and nickel chloride, distilling from said extract in a first distillation zone a fraction containing ester, returning this ester-containing fraction to the extraction zone, distilling in a second distillation zone from the solution remaining after distillation of the ester-containing fraction an alcohol-containing fraction whereby a bottoms solution is obtained rich in nickel chloride, in a third distillation zone subjecting the said alcohol fraction to distillation with return of light overhead fractions therefrom to the second distillation zone, taking off alcohol, taking off part of said bottoms solution, diluting the rest of said bottoms solution with water, and passing the resulting diluted solution into said extraction zone at said upward point.

6. A process for obtaining an ester of acrylic acid and a water-soluble, aliphatic, monohydric alcohol, ROH, in which R is an alkyl group of not over four carbon atoms and recovering an alcohol and the nickel content from a mixture comprising said ester, a said alcohol, and nickel chloride which comprises passing said mixture into an extracton zone at an intermediate point thereof, flowing it upwardly in said zone, introducing into said zone at an upward point thereof an aqueous solution of nickel chloride, passing said solution downwardly through the upwardly flowing mixture, taking off from an upward portion of said zone an organic liquid rich in said ester, fractionally distilling said portion, separating therefrom said ester, withdrawing from a lower point of said zone an extract containing alcohol, ester, and nickel chloride, distilling from said extract in a first distillation zone a fraction containing ester, returning this ester-containing fraction to the extraction zone, distilling in a second distillation zone from the solution remaining after distillation of the ester-containing fraction an alcohol-containing fraction whereby a bottoms solution is obtained rich in nickel chloride, in a third distillation zone subjecting the said alcohol fraction to azeotropic distillation, taking off an overhead distillate and returning it to the second distillation zone, withdrawing dehydrated alcohol from said third distillation zone, taking off said bottoms solution from the second distillation zone, withdrawing part of said solution, diluting the rest of it with water, and passing the resulting diluted solution into the extraction zone at said upward point.

7. The process of claim 6 wherein the alcohol is ethyl alcohol and the ester is ethyl acrylate.

8. The process of claim 6 wherein the alcohol is isopropyl alcohol and the ester is isopropyl acrylate.

9. The process of claim 6 wherein the alcohol is n-propyl alcohol and the ester is n-propyl acrylate.

10. The process of claim 6 wherein the alcohol is tert.-butyl alcohol and the ester is tert.-butyl acrylate.

JAMES L. VAUGHAN.
DAVID R. MERRILL.

No references cited.